(12) United States Patent
Blankenship et al.

(10) Patent No.: US 7,761,336 B1
(45) Date of Patent: Jul. 20, 2010

(54) SYSTEM AND METHOD FOR MANAGING WELDING CONSUMABLES

(75) Inventors: George Daryl Blankenship, Chardon, OH (US); Christopher Hsu, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 573 days.

(21) Appl. No.: 09/838,970

(22) Filed: Apr. 20, 2001

(51) Int. Cl.
G06Q 30/00 (2006.01)

(52) U.S. Cl. .................. 705/26; 705/1; 219/121.11

(58) Field of Classification Search .............. 705/25, 705/26, 27; 219/121, 131
See application file for complete search history.

(56) References Cited

U.S. PATENT DOCUMENTS

| | | | |
|---|---|---|---|
| 4,877,940 A | 10/1989 | Bangs et al. | |
| 4,985,612 A | 1/1991 | Izume et al. | |
| 4,996,409 A * | 2/1991 | Paton et al. | 219/130.01 |
| 5,184,179 A * | 2/1993 | Tarr et al. | 399/8 |
| 5,349,156 A * | 9/1994 | Madigan et al. | 219/130.01 |
| 5,369,570 A | 11/1994 | Parad | |
| 5,463,555 A * | 10/1995 | Ward et al. | 700/96 |
| 5,808,885 A * | 9/1998 | Dew et al. | 700/3 |
| 5,850,066 A * | 12/1998 | Dew et al. | 219/109 |
| 5,859,847 A * | 1/1999 | Dew et al. | 370/389 |
| 5,946,662 A | 8/1999 | Ettl et al. | |
| 5,948,061 A | 9/1999 | Merriman et al. | |
| 5,953,707 A | 9/1999 | Huang et al. | |
| 5,960,411 A | 9/1999 | Hartman et al. | |
| 6,040,555 A * | 3/2000 | Tiller et al. | 219/132 |
| 6,085,169 A | 7/2000 | Walker et al. | |
| 6,091,048 A * | 7/2000 | Lanouette et al. | 219/130.21 |
| 6,096,994 A | 8/2000 | Handa et al. | |
| 6,405,178 B1 * | 6/2002 | Manchala et al. | 705/29 |
| 6,486,439 B1 * | 11/2002 | Spear et al. | 219/136 |
| 6,681,349 B2 * | 1/2004 | Sekizawa | 714/47 |

(Continued)

FOREIGN PATENT DOCUMENTS

WO 01/12374 A1 2/2001

(Continued)

OTHER PUBLICATIONS

No Author, "Microsoft Press Computer Dictionary", Third Edition, 1997, pp. 384, 441.*

(Continued)

*Primary Examiner*—Jason Dunham
(74) *Attorney, Agent, or Firm*—Turocy & Watson, LLP

(57) ABSTRACT

A system and method for managing welding consumable(s) is provided. The invention includes a welder having a consumable(s) monitor, a customer system and/or a remote system. The invention further provides for monitoring of welding consumable(s) usage and ordering of welding consumable(s) from suppliers, distributors and/or manufacturers. The invention further provides for an optional arc/weld quality monitor that provides information regarding weld quality. The invention further provides for invoicing a customer for welding consumable(s) as the consumable(s) are used by the customer. The invention further provides for invoicing of customers for welding consumable(s) that produce acceptable welds. The invention further provides for remote management of customer welding consumable(s) inventory based at least in part upon information received regarding welding consumable(s) usage. The invention further provides for communication with a production component, financial accounting component and/or materials management component in order to facilitate automation of welding consumable(s) management.

26 Claims, 11 Drawing Sheets

U.S. PATENT DOCUMENTS

| | | | |
|---|---|---|---|
| 6,721,284 B1* | 4/2004 | Mottishaw et al. | 370/255 |
| 6,797,921 B1* | 9/2004 | Niedereder et al. | 219/130.5 |
| 7,245,875 B2* | 7/2007 | Clark et al. | 455/41.1 |
| 2002/0049638 A1 | 4/2002 | Ito | |
| 2003/0212929 A1* | 11/2003 | Sekizawa | 714/47 |

FOREIGN PATENT DOCUMENTS

| | | |
|---|---|---|
| WO | 0112374 A | 2/2001 |

OTHER PUBLICATIONS

Bennett, B. J. "Using a microcomputer in costing and selling", Computer technology in welding, Jun. 1986, paper 36, pp. 341-346.*

Blackmon et al. "A Real Time Approach to Quality Control in Welding", Welding Journal, Aug. 1983, pp. 37-39.*

No Author, "Retrospective", American Machinist, Jan. 2000. Retreived from Dialog File: 148, Accession #: 11802296.*

Yun et al. "Development of Web-based Monitoring System for Welding Robots in Shipbuilding", ICCAS2002, Jeonbuk, Korea, Oct. 16-19, pp. 663-666.*

Baruch et al. "Remote control and robots: an Internet solution", Computing & Control Engineering Journal, Feb. 1996, pp. 39-45.*

International Search Report Dated Mar. 4, 2003 for International Application No. PCT/US02/11017.

Europena Search Report dated May 18, 2007, mailed Jun. 26, 2007 for PCT Application 02721696, 2 pages.

ISR dated Dec. 14, 2000, for PCT Application Serial No. PCT/AT 00/00221, 4 pages.

\* cited by examiner

SYSTEM AND METHOD FOR MANAGING WELDING CONSUMABLES

TECHNICAL FIELD

The present invention relates generally to welding systems. More particularly, the invention relates to a system and method for managing welding consumable(s) based at least in part upon information received from a consumable(s) monitor.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modern and more complex manufacturing operations however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers, and/or across the globe, has become more challenging, time consuming and expensive.

One such challenge relates to management of welding consumables (e.g., gas, flux, contact tip and/or consumable electrode). Conventionally, welding consumables are often tracked and ordered by operators or supervisors responsible for the welding process. This generally involves manually inventorying and keeping track of projected production needs and then ordering supplies long enough in advance so that production may continue. Manual processes such as those involved with ordering and inventory activities are time consuming and often require duplication of efforts by multiple people and departments. When orders are finally placed, mistakes can occur as catalog and/or part numbers are given to suppliers. Additionally, suppliers and distributors often have trouble planning for expected demands, since knowledge of actual product usage may not be gained until the order is actually placed.

Another challenge relates to financial accounting of welding consumables (e.g., wire, gas, flux, contact tip and/or consumable electrode). In the industrial environment, resource planning can have an impact on profitability. In order to maximize profitability, various cost reduction strategies have been implemented, for example, "just in time inventory". With the advent of "just in time inventory" and other cost reduction strategies, the significance of resource planning has increased since improper resource planning can lead to potentially harmful results (e.g., failure to have necessary welding consumable(s) when needed).

Yet another challenge relates to production control. Conventionally, records of production control (e.g., quality of welds produced) have been kept manually by an operator or supervisor responsible for the welding process. Such manual processes are time consuming and often lead to inconsistent and/or inaccurate records.

Due to the problems described above and other problems associated with conventional systems, there is an unsolved need for a system and method for managing welding consumable(s).

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for managing welding consumable(s). A welder includes a consumable(s) monitor and, optionally, an arc/weld quality monitor. A customer system and/or welder can be connected to a remote system (e.g., via a network, the Internet and/or an extranet). The customer system and/or the remote system can monitor consumable(s) usage based at least in part upon information received from the consumable(s) monitor. The customer system and/or the remote system can perform production control functions, financial accounting functions and/or materials management functions based at least in part upon information obtained from the consumable(s) monitor and/or the arc/weld quality monitor.

According to an aspect of the present invention, information received from the consumable(s) monitor can be used to perform accounting tasks, for example, to periodically post inventory valuation and cost of goods sold to general ledger accounts, to perform a physical count of inventory items (e.g., for an audit), to calculate inventory turnover rate, and to perform analysis of various accounting methods (e.g., last in first out or first in first out) to determine potential benefits (e.g., to realize maximum tax savings).

Information received from the consumable(s) monitor can further be used to facilitate inventory control and can include purchasing, material(s) requirement forecasting and modeling of material(s) usage. Information received from the consumable(s) monitor can be used to control production and/or monitor consumable demand rate to lower inventory and boost service level based upon a production control policy.

The present invention also provides methods for managing welding consumable(s), ordering of welding consumable(s) based at least in part upon monitored consumable(s) usage, invoicing of welding consumable(s) based at least in part upon monitored consumable(s) usage and, optionally, monitor weld quality, and leasing of welding equipment.

To the accomplishment of the foregoing and related ends, certain illustrative aspects of the invention are described

DESCRIPTION OF THE INVENTION

Figure 1:
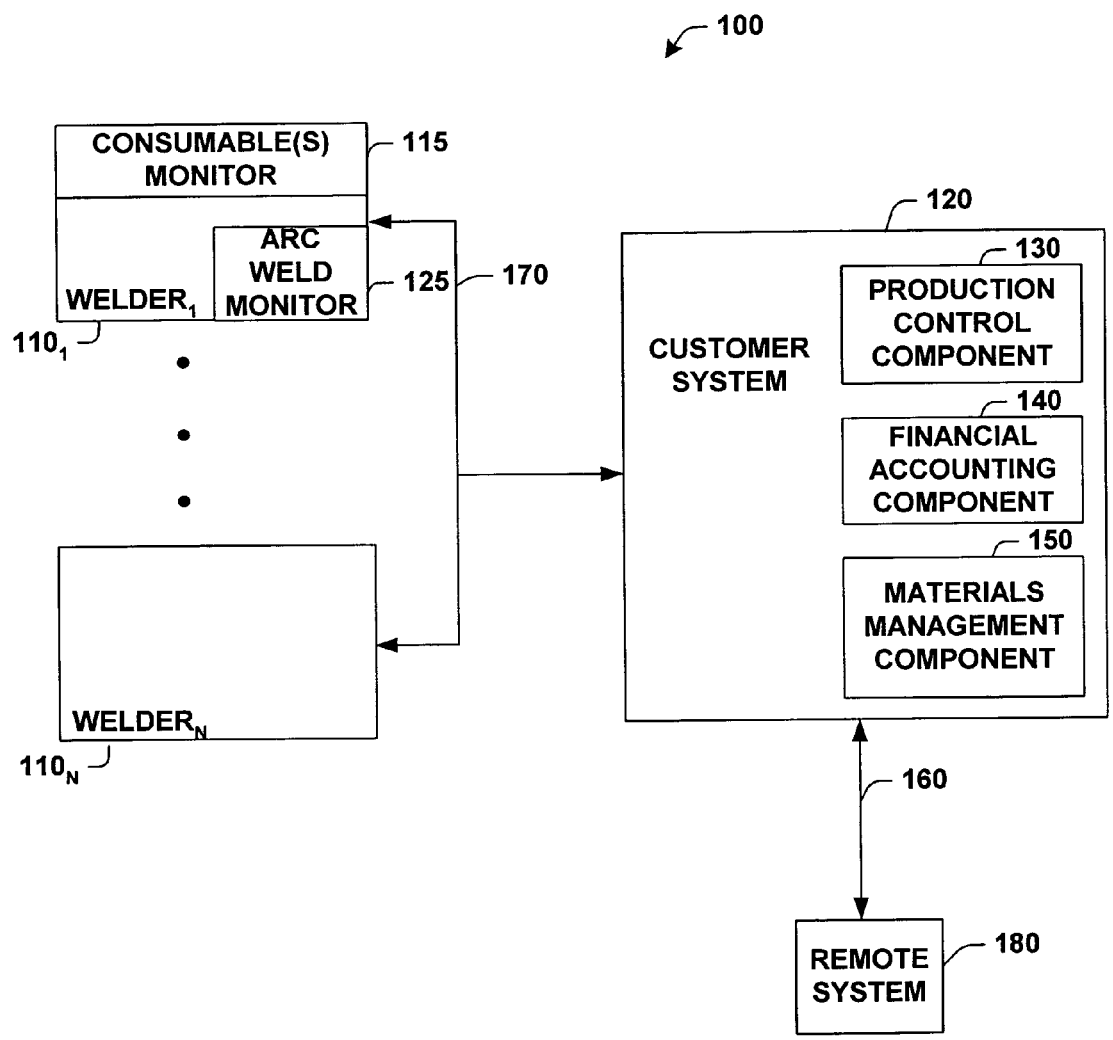
FIG. 1 is a schematic block diagram illustrating a system for managing welding consumable(s) in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, "system" is a structure comprising one or more components. A "component" is a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server can be components. One or more components may reside within a process, and/or thread of execution and a component may be localized on one computer and/or distributed between two or more computers. Due to the nature of components, multiple components can be intermingled and are often not separate from one another. Systems can likewise be intermingled and inseparable. Further, "extranet" refers to a network of trusted trading partners communicating securely via a network that can be, but is not limited to, the Internet, a local area network, a computer network, an Intranet, a wide area network, a virtual private network, a metropolitan area network, and a wireless network.

A "welder" refers to physical hardware for producing a weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source along with any controller(s), monitor(s) and communications interface(s) associated with the physical hardware. For example, a welder can be used to perform gas metal arc welding (MIG), flux cored arc welding, metal cored arc welding, submerged arc welding (SAW), narrow groove welding, hot wire filled gas tungsten arc (TIG) welding, cold wire filled TIG welding, plasma arc welding, electron beam and laser welding, hardface welding, arc gauging and manual shielded arc welding (stick welding).

As used in this application, "wire" refers to chemical and/or metallic material utilized by a welder and can include, but is not limited to, MIG wire, flux-cored wire, bare metal wire, stainless steel wire and core wire. For example, wire can be utilized to perform gas metal arc welding, flux cored arc welding, metal cored arc welding, submerged arc welding, narrow groove welding, hot wire filled TIG welding, cold wire filled TIG welding, plasma arc welding, electron beam and laser welding, and hardfacing or cladding. Further, "stick electrode" refers to welding filler metal having a core of bare electrode covered by chemical and/or metallic materials portions of which are melted during the welding process and deposited on the work piece and can include, but is not limited to, a stick electrode utilized in stick welding. For example, a consumable electrode can be utilized to perform arc gauging and manual shielded arc welding.

Referring to FIG. 1, a system 100 for managing welding consumable(s) in accordance with an aspect of the present invention is illustrated. The system 100 includes a welder $110_1$ through an Nth welder $110_N$, N being an integer greater than or equal to one. The welders $110_1$ through $110_N$ can be referred to collectively as the welder 110. The welder 110 has a consumable(s) monitor 115 that is adapted to monitor welding consumable(s) (e.g., wire, consumable electrode, gas and/or flux) that have been consumed by the welder 110 and/or consumable(s) remaining (e.g., wire left on a drum). Optionally, the welder 110 can have an arc/weld quality monitor 125 that is adapted to monitor other aspects of the welding process, for example, quality and/or production control.

The welder 110 is operatively coupled via a local network 170 to a customer system 120. For example, the local network 170 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP User Datagram Protocol (UDP), PPTP (Point-to-Point Tunneling Protocol), L2TP (Layer Two Tunneling Protocol), IPsec (Internet Protocol Security) and SOCKS.

The customer system 120 can include a production control component 130, a financial accounting component 140 and/or a materials management component 150. The production control component 130 facilitates monitoring of customer production and can include, but is not limited to, weld production. For example, the production control component 130 can receive information from the arc/weld quality monitor 125 regarding quality of welds produced by the welder 110. The production control component can measure and/or monitor consumable demand rate to lower inventory and boost service level based upon a production control policy (e.g., Kanban, Minimal Blocking, Basestock, CONWIP). The production control component, at least based in part upon information received from the consumable(s) monitor 115, can further be adapted to perform production capacity planning and/or welding consumable(s) forecast planning.

The financial accounting component 130 facilitates customer accounting, budgeting and/or financial forecasting. For example, the financial accounting component 130 can receive information regarding welding consumable(s) (e.g., wire, consumable electrode, gas and/or flux) that have been consumed by the welder 110 and/or consumable(s) remaining (e.g., wire left on a drum) from the consumable(s) monitor 115 through the welder 110 via the network 170. The financial accounting component 130 can utilize the information received from the consumable(s) monitor 115 to perform accounting tasks, for example, to periodically post inventory valuation and cost of goods sold to general ledger accounts, to perform a physical count of inventory items (e.g., for an audit), to calculate inventory turnover rate, and to perform analysis of various inventory strategies (e.g., last in first out or first in first out) to determine potential benefits (e.g., to realize maximum tax savings).

The materials management component 150 facilitates customer inventory control and can include purchasing, material(s) requirement forecasting and modeling of material(s) usage. For example, the materials management component 150 can receive information regarding welding consumable(s) (e.g., wire, consumable electrode, gas and/or flux) that have been consumed by the welder 110 from the consumable(s) monitor 115 through the welder 110 via the network 170. The materials management component 150 can utilize the information received from the consumable(s) monitor 115 to manage consumable(s) (e.g., wire, gas, flux, contact tip and/or consumable electrode). For example, as a consumable is used in production (e.g., wire), a customer's work in process wire inventory can correspondingly reflect the usage of the consumable (e.g., decrease in available inventory of particular consumable).

The customer system 120 can have one or more network connections to a remote system 180 via an extranet 160. For example, the connection can be via a phone connection to an Internet Service Provider (ISP) to the remote system 180. Another possible connection is via a Local Area Network (LAN) to the remote system 180. It is noted that the welder 110 and associated welding equipment (not shown) can communicate over a separate and isolated network (e.g., Arclink) from the network 170 and/or the extranet 160. Information exchanged between the customer system 120 and the remote system 180 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, ActiveX, XML, PDF, EDI, WML as well as other formats.

The materials management component 150 can further implement an automatic ordering system using, for example, if inventory supply of a consumable falls below a predetermined level, the materials management component 150 can initiate an order of the consumable by communicating with the remote system 180 via the extranet 160 (e.g., using EDI or XML documents). The order can be monitored and/or controlled by the customer system 120. Further, the remote system 180 can process the order and initiate an order confirmation invoice acknowledging the order and providing information to the customer system 120. For example, the remote system 180 can inform the customer system 120 of the lead time and expected delivery date for the order. Thus the present invention can result in increased liquidity for a customer and/or decreased inventory levels.

Further, the remote system 180 can monitor the usage of particular consumable(s), for example, to forecast future needs for consumable(s) in order to prevent shortages. Additionally, at least based in part upon information received from the consumable(s) monitor, the remote system 180 can generate market trending information for strategic planning, perform enterprise resource planning, production capacity planning and/or welding consumable(s) forecast planning.

Figure 2:
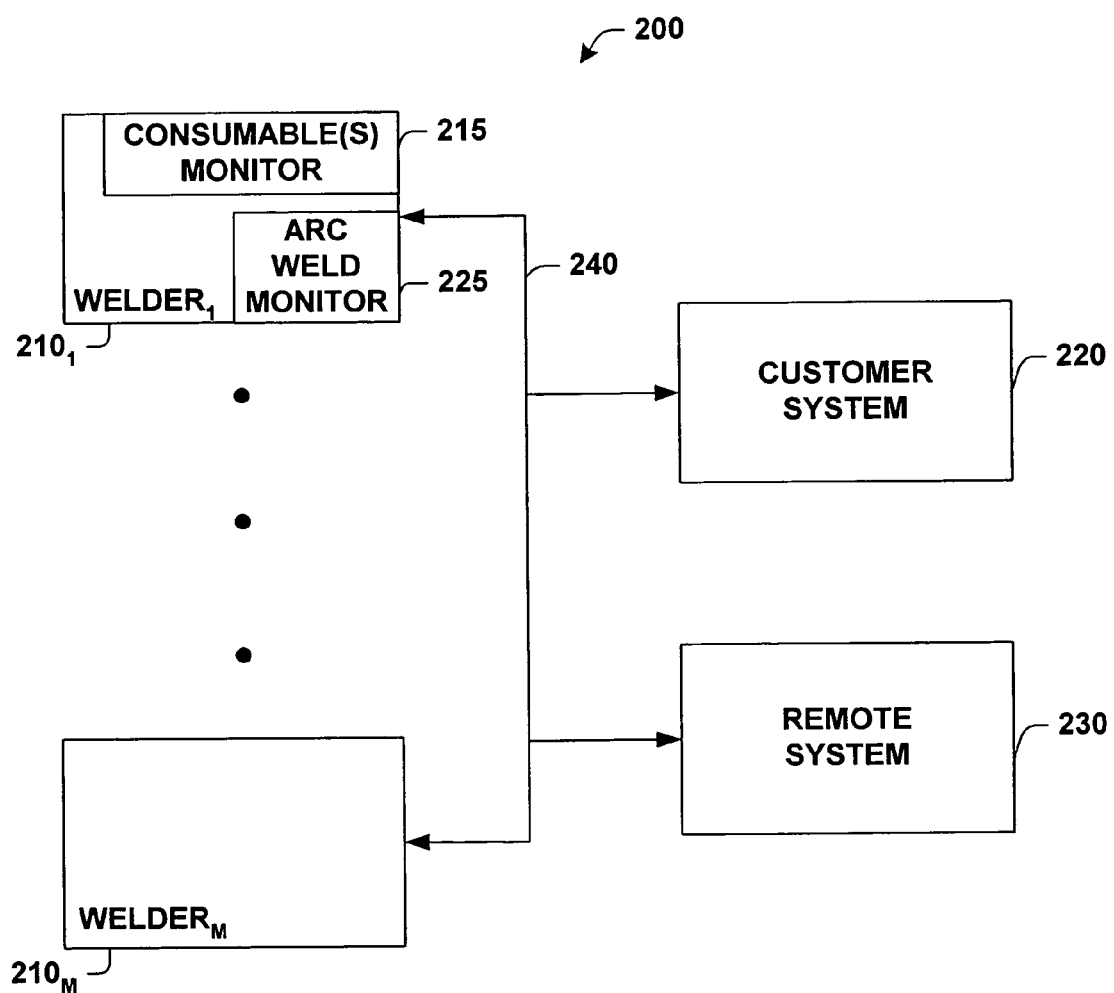
FIG. 2 is a schematic block diagram illustrating a system for managing welding consumable(s) in accordance with an aspect of the present invention.

Turning to FIG. 2, a system 200 for managing welding consumable(s) is illustrated. The system 200 includes a welder $210_1$ through an Mth welder $210_M$, M being an integer greater than or equal to one. The welders $210_1$ through $210_{mM}$ can be referred to collectively as the welder 210. The welder 210 has a consumable(s) monitor 215 that is adapted to monitor welding consumable(s) (e.g., wire, consumable electrode, gas and/or flux) that have been consumed by the welder 210 and/or consumable(s) remaining (e.g., wire left on a drum). Optionally, the welder 210 can have an arc/weld quality monitor 225 that is adapted to monitor other aspects of the welding process, for example, quality and/or production control.

The welder 210 is operatively coupled via a network 240 to a customer system 220 and/or remote system 230. For example, the network 240 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP, User Datagram Protocol (UDP), PPTP (Point-to-Point Tunneling Protocol), L2TP (Layer Two Tunneling Protocol), IPsec (Internet Protocol Security) and SOCKS.

The network connection can be via an extranet. For example, the network connection can be via a phone connection (not shown) from the welder 210 to an Internet Service Provider (ISP) to the customer system 220 and/or the remote system 230. Another possible network connection is via a Local Area Network (LAN) to the customer system 220 and the remote system 230. It is noted that the welder 210 and associated welding equipment (not shown) can communicate over a separate and isolated network from the network 240 (e.g., Arclink). Information exchanged between and among the welder 210, the customer system 220 and the remote system 230 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, ActiveX, XML, PDF, EDI, WML as well as other formats.

For example, a supplier of welding consumables can maintain an inventory of welding consumables at a customer location (e.g., ownership of welding consumables remains with supplier—Vendor Managed Inventory (VMI)). At least in part based upon information obtained from the consumable(s) monitor 215 through the welder 210, the remote system (e.g., supplier's computer system) can allocate and/or charge the customer for welding consumable(s) once they are used by the customer. This can result in decreased costs to the customer associated with maintaining inventory since the customer is not charged for the welding consumable(s) until the consumable(s) has been used. Further, the customer can delegate to the supplier responsibility for maintaining inventory of welding consumable(s) at the customer location, thus reducing the customer's costs associated with materials management.

The remote system 230 can also monitor information obtained from the arc/weld quality monitor 225 through the welder 210 regarding quality of welds produced by the welder 210. By obtaining information from both the arc welder monitor 225 and the consumable(s) monitor 215, the remote system (e.g., supplier, distributor and/or manufacturer) can allocate and/or charge the customer for welding consumable(s) that have been used by the customer and that produced acceptable welds. This can result in cost savings to the customer since the customer is paying for welding consumable(s) that have produced acceptable welds.

Figure 3:
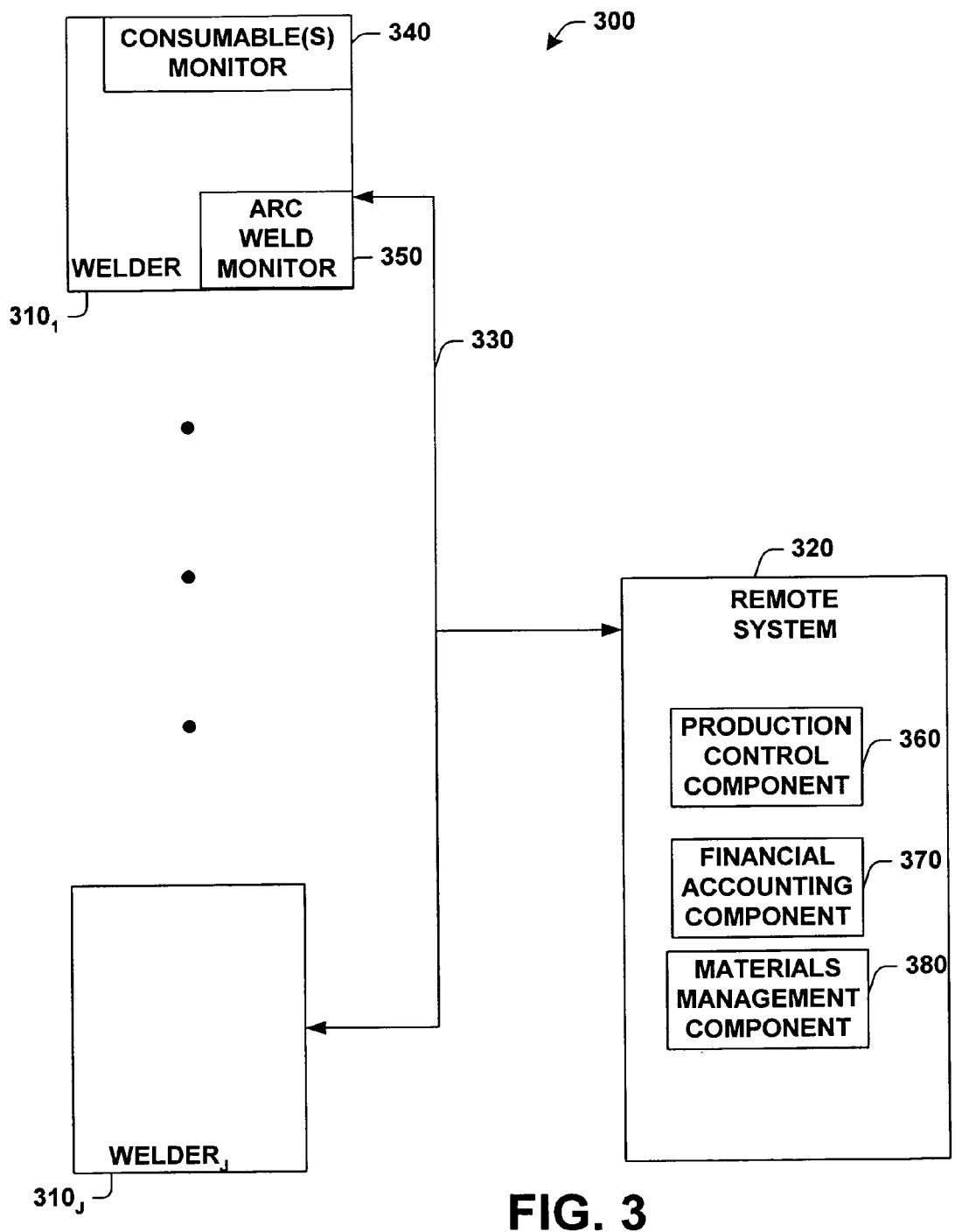
FIG. 3 is a schematic block diagram illustrating a system for managing welding consumable(s) in accordance with an aspect of the present invention.

FIG. 3 illustrates a system 300 for managing welding consumable(s) in accordance with an aspect of the present invention. The system 300 includes a welder $310_1$ through a Jth welder $310_J$, J being an integer greater than or equal to one. The welders $310_1$ through $310_J$ can be referred to collectively as the welder 310. The welder 310 has a consumable(s) monitor 340 that is adapted to monitor welding consumable(s) (e.g., wire, consumable electrode, gas and/or flux) that have been consumed by the welder 310 and/or consumable(s) remaining (e.g., wire left on a drum). Optionally, the welder 310 can have an arc/weld quality monitor 350 that is adapted to monitor other aspects of the welding process, for example, quality and/or production control.

The welder 310 is operatively coupled via a network 330 to a remote system 320. For example, the network 330 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP, User Datagram Protocol (UDP), PPTP (Point-to-Point Tunneling Protocol), L2TP (Layer Two Tunneling Protocol), IPsec (Internet Protocol Security) and SOCKS. The network connection can be via an extranet (e.g., network connection via a phone connection (not shown) from the welder 310 to an Internet Service Provider (ISP) to the remote system 320). It is noted that the welder 310 and associated welding equipment (not shown) can communicate over a separate and isolated network from the network 330 (e.g., Arclink). Information exchanged between and among the welder 310, and the remote system 320 can be in a variety of formats and can include, but is not limited to, such technologies as EDI, HTML, SHTML, VB Script, JAVA, CGI Script, JAVA Script, dynamic HTML, PPP, RPC, TELNET, TCP/IP, FTP, ASP, ActiveX, XML, PDF, WML as well as other formats. For example, the remote system 320 can be a system operated by a customer (e.g., remote system for monitoring a plurality of physical plants), a distributor of welding consumable(s), a supplier of welding consumable(s) and/or a manufacturer of welding consumable(s).

The remote system 320 can include a production control component 360, a financial accounting component 370 and/or a materials management component 380. The production control component 360 facilitates monitoring of weld production by the welder 310. Further, the production control component 360 can receive information from the consumable(s) monitor 340 regarding welding consumable(s) (e.g., wire, consumable electrode, gas and/or flux) that have been consumed by the welder 310 and/or consumable(s) remaining (e.g., wire left on a drum). The production control component can measure and/or monitor consumable demand rate to lower inventory and boost service level based upon a production control policy (e.g., Kanban, Minimal Blocking, Basestock, CONWIP). Thus, a customer can delegate responsibility for production control to, for example, a supplier of welding consumables which can result in a decrease in production control costs for the customer.

The financial accounting component 370 facilitates customer accounting, budgeting and/or financial planning. The remote system 320 can be, for example, a system operated by a customer's accounting firm. The financial accounting component 370 can receive information regarding welding consumable(s) (e.g., wire, consumable electrode, gas and/or flux) that have been consumed by the welder 310 and/or consumable(s) remaining (e.g., wire left on a drum) from the consumable(s) monitor 340 through the welder 310 via the network 330. The financial accounting component 370 of the remote system 320 can utilize the information received from the consumable(s) monitor 340 to perform accounting tasks, for example, to periodically post inventory valuation and cost of goods sold to general ledger accounts, to perform a physical count of inventory items (e.g., for an audit), to calculate inventory turnover rate, and to perform analysis of various accounting methods (e.g., last in first out or first in first out) to determine potential benefits (e.g., to realize maximum tax savings).

The materials management component 380 facilitates customer inventory control and can include purchasing, material(s) requirement forecasting and modeling of material(s) usage. The remote system 320 can be a system operated by a customer (e.g., remote system for monitoring a plurality of physical plants), a distributor of welding consumable(s), a supplier of welding consumable(s) and/or a manufacturer of welding consumable(s). The materials management component 380 of the remote system 320 can receive information regarding welding consumable(s) (e.g., wire, consumable electrode, gas and/or flux) that have been consumed by the welder 310 from the consumable(s) monitor 340 through the welder 310 via the network 330. The materials management component 380 can utilize the information received from the consumable(s) monitor 340 to manage consumable(s) (e.g., wire, gas, flux, contact tip and/or consumable electrode).

For example, the remote system 320 can be a system operated by a manufacturer of welding consumable(s). The manufacturer can remotely monitor usage of welding consumable(s) and replenish a customer's supply of welding consumable(s) based at least in part upon information obtained through the consumable(s) monitor 340. Thus, a customer can delegate responsibility for inventory production control to, for example, a manufacturer of welding consumable(s), which can result in a decrease in materials management costs and/or production control costs for the customer.

Figure 4:
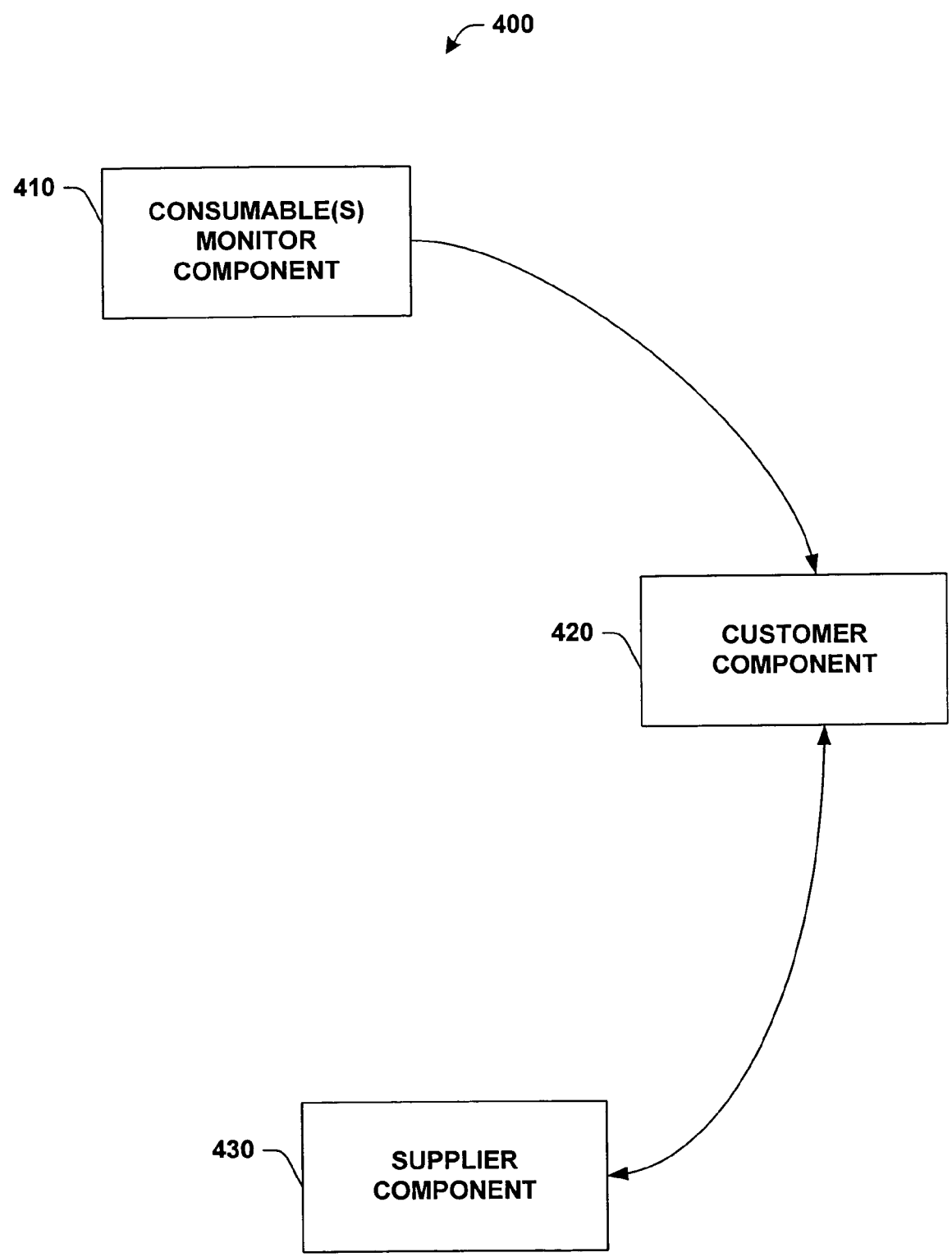
FIG. 4 is a block diagram illustrating a system for managing welding consumable(s) in accordance with an aspect of the present invention.

Referring to FIG. 4, a system 400 for managing welding consumable(s) in accordance with an aspect of the present invention is illustrated. The system 400 includes a consumable(s) monitor component 410 for monitoring usage of welding consumable(s) (e.g., wire, gas, flux, contact tip and/or consumable electrode). The system 400 can further include a customer component for receiving and/or analyzing information received from the consumable(s) monitor component 410. The system 400 can further include a supplier component 430 for receiving information from the customer component 420 regarding welding consumables.

The consumable(s) monitor component 410 can monitor welding consumable(s) (e.g., wire, consumable electrode, gas and/or flux) that have been consumed by a welder and/or consumable(s) remaining (e.g., wire left on a drum). Additionally, the consumable(s) monitor component can monitor other aspects of the welding process, for example, quality and/or production control.

The customer component 420 can receive information from the consumable(s) monitor component 410 to perform production control, financial accounting and/or materials management functions. Based at least in part upon information received from the consumable(s) monitor component 410, the customer component 420 can initiate ordering of welding consumable(s) that can be communicated to the supplier component 430. The order can be monitored and/or controlled by the customer component 420. Further, the supplier component 430 can process the order and initiate an order confirmation invoice acknowledging the order and providing information to the customer component 420. For example, the supplier component 430 can inform the customer component 420 of the lead time and expected delivery date for the order.

Figure 5:
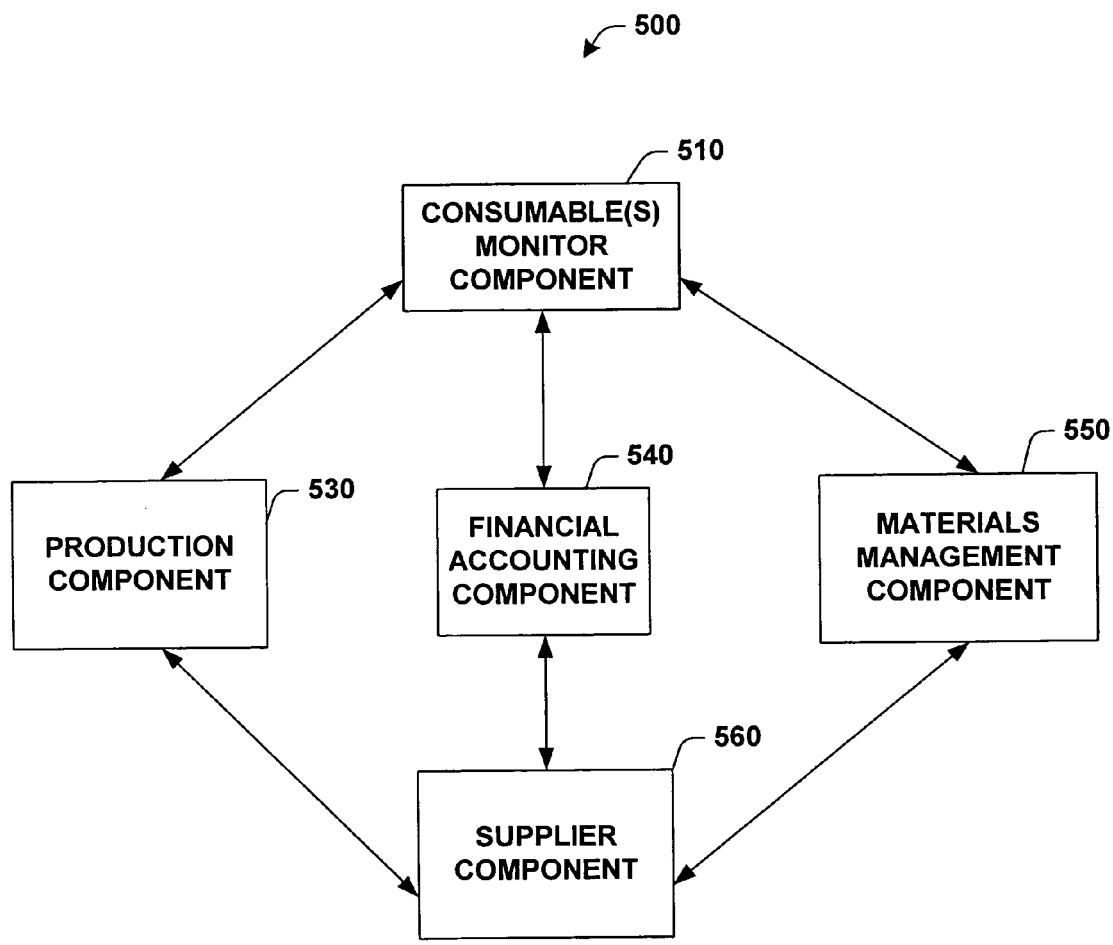
FIG. 5 is a block diagram illustrating a system for managing welding consumable(s) in accordance with an aspect of the present invention.

Next, referring to FIG. 5, a system 500 for managing welding consumable(s) in accordance with an aspect of the present invention is illustrated. The system 500 includes a consumable(s) monitor component 510 for monitoring usage of welding consumable(s) (e.g., wire, gas, flux, contact tip and/or consumable electrode). The system 500 can also include a production component 530, a financial accounting component 540 and/or a materials management component 550 for receiving and/or analyzing information received from the consumable(s) monitor component 510. The system 500 can further include a supplier component 560 for receiving information from the production component 530, the accounting component 540 and/or the materials management component 550 regarding welding consumable(s).

For example, the consumable(s) monitor component 510 can monitor welding consumable(s) (e.g., wire, consumable electrode, gas and/or flux) that have been consumed by a welder and/or consumable(s) remaining (e.g., wire left on a drum). Additionally, the consumable(s) monitor component can monitor other aspects of the welding process, for example, quality and/or production control.

In response to receiving information from the consumable(s) monitor component 510, the production component 530 can monitor weld production of one or more welders. For example, the production component 530 can receive information from the consumable(s) monitor component 510 regarding quality of welds produced by a welder. Further, the production component 530 can receive information from the consumable(s) monitor component 510 regarding welding consumable(s) (e.g., wire, consumable electrode, gas and/or flux) that have been consumed by a welder and/or consumable(s) remaining (e.g., wire left on a drum). The production component 530 can measure and/or monitor consumable demand rate to lower inventory and boost service level based upon a production control policy (e.g., Kanban, Minimal Blocking, Basestock, CONWIP).

The financial accounting component 540 can perform accounting, budgeting and/or financial forecasting. For example, the financial accounting component 540 can receive information regarding welding consumable(s) (e.g., wire, consumable electrode, gas and/or flux) that have been consumed by a welder and/or consumable(s) remaining (e.g., wire left on a drum) from the consumable(s) monitor component 510. The financial accounting component 540 can utilize the information received from the consumable(s) monitor component 510 to perform accounting tasks, for example, to periodically post inventory valuation and cost of goods sold to general ledger accounts, to perform a physical count of inventory items (e.g., for an audit), to calculate inventory turnover rate, and to perform analysis of various inventory strategies (e.g., last in first out or first in first out) to determine potential benefits (e.g., to realize maximum tax savings).

The materials management component 550 facilitates customer inventory control and can include purchasing, material(s) requirement forecasting and modeling of material(s) usage. For example, the materials management component 550 can receive information regarding welding consumable(s) (e.g., wire, consumable electrode, gas and/or flux) that have been consumed by a welder from the consumable(s) monitor component 510. The materials management component 550 can utilize the information received from the consumable(s) monitor component 510 to manage consumable(s) (e.g., wire, gas, flux, contact tip and/or consumable electrode). For example, as a consumable is used in production (e.g., wire), a customer's work in process wire inventory can correspondingly reflect the usage of the consumable (e.g., decrease in available inventory of particular consumable).

The materials management component 550 can further implement an ordering system using, for example, initiating ordering of a particular consumable once customer inventory of the consumable has fallen below a predetermined threshold amount by communicating with the supplier component 560. The order can be monitored and/or controlled by the materials management component 550 and/or the financial accounting component 540. Further, the supplier component 560 can process the order and initiate an order confirmation invoice acknowledging the order and providing information to the materials management component 550 and/or the financial accounting component 540. For example, the supplier component 560 can inform the materials management component 550 and/or the financial accounting component 540 of the lead time and expected delivery date for the order.

Figure 6:
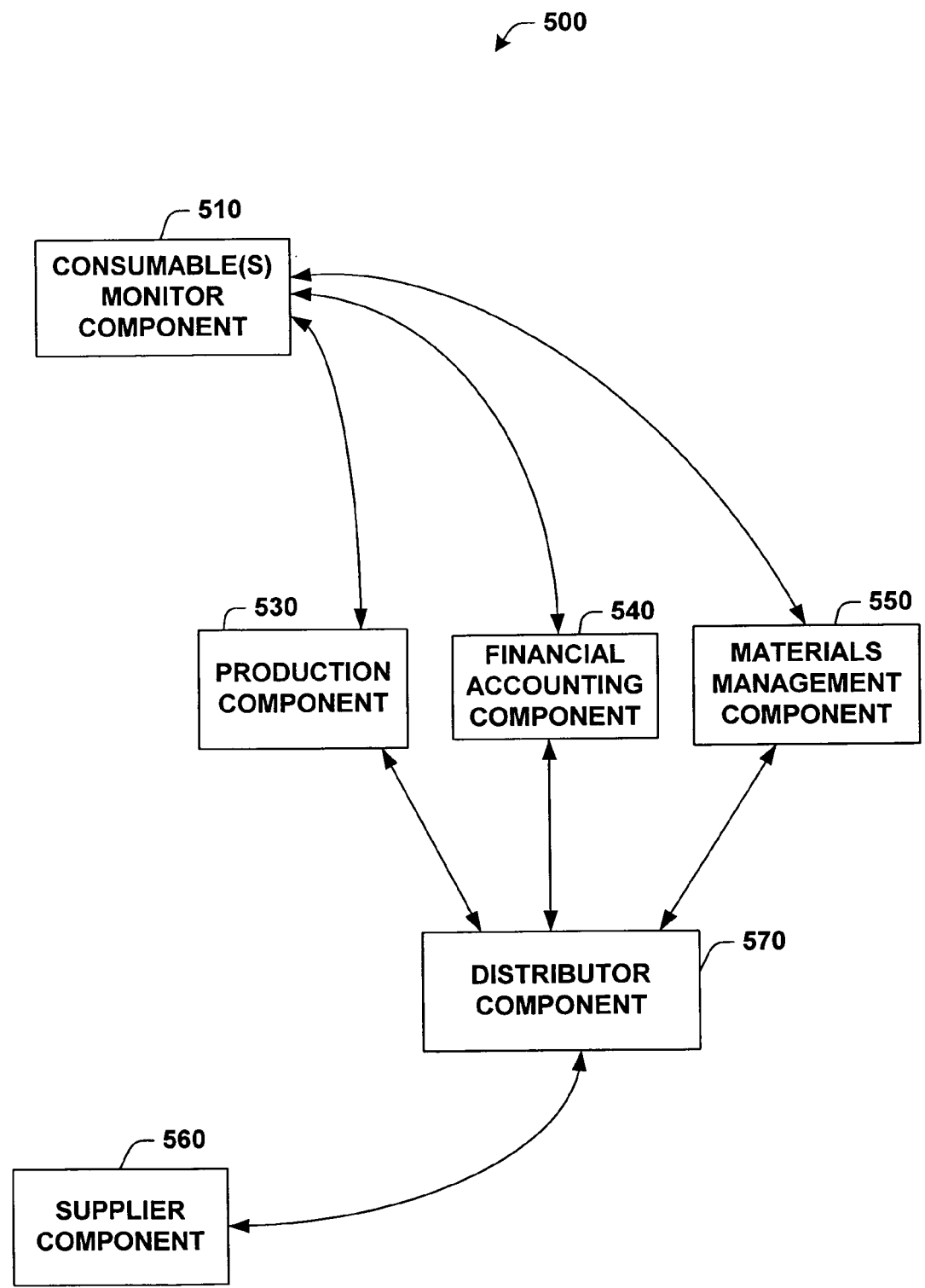
FIG. 6 is a block diagram illustrating a system for managing welding consumable(s) in accordance with an aspect of the present invention.

Referring to FIG. 6, a system 600 for managing welding consumable(s) in accordance with an aspect of the present invention is illustrated. The system 600 can include a consumable(s) monitor component 510, a production component 530, a financial accounting component 540, a materials management component 550 and a supplier component 560. Additionally, the system 600 can include a distributor component 570 that can receive information from the production component 530, the financial accounting component 540 and/or the materials management component 550. The distributor 570 can communicate information to the supplier component 560.

For example, the distributor component 570 can receive information regarding welding consumable(s) usage from a plurality of customers and filter and/or aggregate the information before communicating welding consumable(s) ordering to the supplier component 560. For example, the distributor component 570 can receive information regarding welding consumable(s) usage from a plurality of low volume customers. The distributor component 570 can filter and/or aggregate the welding consumable(s) needs of the plurality of low volume customers before communicating with the supplier component 560. This can result in decreased material costs to the low volume customers who can benefit from purchasing strength of their aggregated needs (e.g., lower per unit cost). This can further result in inventory optimization for distributors.

Figure 7:
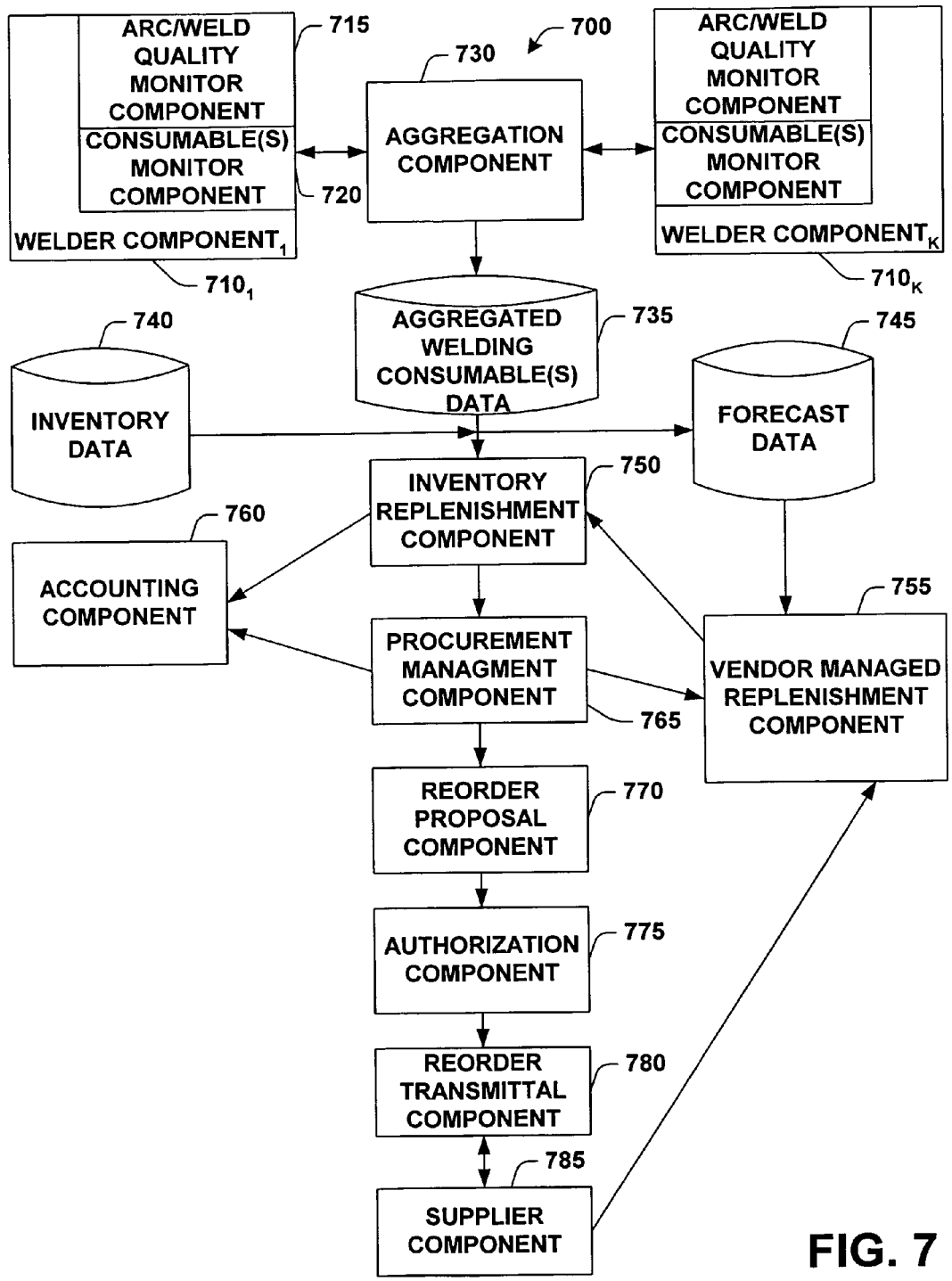
FIG. 7 is a block diagram illustrating a system for managing welding consumable(s) in accordance with an aspect of the present invention.

Turning to FIG. 7, a system 700 for managing welding consumable(s) in accordance with an aspect of the present invention is illustrated. The system 700 includes a welder component $710_1$ through a Kth welder component $710_K$, K being an integer greater than or equal to one. The welder component $710_1$ through $710_K$ can be referred to collectively as the welder component 710. The welder component 710 can facilitate the welding process. The welder component 710 includes a consumable(s) monitor component 720 for monitoring usage of welding consumable(s) (e.g., wire, gas, flux, contact tip and/or consumable electrode) and, optionally, an arc/welder quality monitor component 715.

The system 700 further includes an aggregation component 730 for aggregating information received from the consumable(s) monitor component 720 and, optionally, from the arc/weld monitor component 715. The system 700 further includes aggregated welding consumable(s) data 735 for storing information associated with welding consumable(s) usage and, optionally, information associated with arc/weld quality, inventory data 740 for storing information associated with welding consumable(s) inventory and forecast data 745 for storing information associated with information associated with forecasting welding consumable(s) needs.

The system 700 further includes a vendor managed replenishment component 755, an inventory replenishment component 750, a procurement management component 765, an accounting component 760, a reorder proposal component 770, an authorization component 775, a reorder transmittal component 780 and a supplier component 785.

The vendor managed replenishment component 755, for example, can include a relationship (e.g., contractual) between a source of welding consumable(s) (e.g., manufacturer, distributor and/or supplier) and a user of welding consumable(s) (e.g., customer). The vendor managed replenishment component 755 can identify a reorder level for welding consumable(s). For example, the reorder level can be based upon the product of a lead time associated with the welding consumable(s) (e.g., obtained in real-time from the supplier component 785) and a welding consumable(s) usage rate (e.g., obtained from the forecast data 745), less any welding consumable(s) in transit (e.g., obtained from the procurement management component 765) and adding any safety stock factor (e.g., obtained from the procurement management component 765). The welding consumable(s) usage rate can be based, at least in part, upon information obtained from the aggregated welding consumable(s) data (e.g., continuous, real-time update of raw materials inventory consumption based, at least in part, upon information obtained via the consumable(s) monitor 720).

For example, a source of welding consumable(s) (e.g., manufacturer, distributor and/or supplier) can lease welding equipment to a customer and contract to supply welding consumable(s) to the customer. The vendor management replenishment component 755 can include information for the source of welding consumable(s) to enforce contractual requirements (e.g., use of minimum amount of welding consumable(s) over specific period of time).

The consumable(s) monitor component 720 can monitor welding consumable(s) (e.g., wire, consumable electrode, gas and/or flux) that have been consumed by a welder and/or consumable(s) remaining (e.g., wire left on a drum). The aggregation component 730 can aggregate welding consumable(s) used by one or a plurality of welder components 710 as transmitted by the consumable(s) monitor component 720. The aggregation component 730 can store information associated with welding consumable(s) usage in the aggregated welding consumable(s) data 735.

In response to receiving information from the aggregated welding consumable(s) data 735, the inventory replenishment component 750 is adapted to initiate replenishment of welding consumable(s). The inventory replenishment component 750 can initiate replenishment of welding consumable(s) based at least in part upon information stored in inventory data 740, aggregated welding consumable(s) data 735 and/or forecast data 745. Further, the inventory replenishment component 750 can initiate replenishment of welding consumable(s) based at least in part upon information associated with the vendor managed replenishment component 755.

Having determined that welding consumable(s) are in need of replenishment, the inventory replenishment component 750 communicates information associated with the replenishment need to the accounting component 760 and/or the procurement management component 765. The procurement management component 765 can manage replenishment of welding consumable(s) and communicate information associated with replenishment of welding consumable(s) to the reorder proposal component 770 and/or the accounting component 760.

The accounting component 760 can perform accounting, budgeting and/or financial forecasting. For example, the accounting component 760 can receive information regarding welding consumable(s) (e.g., wire, consumable electrode, gas and/or flux) that have been consumed by a welder and/or consumable(s) remaining (e.g., wire left on a drum) from the inventory replenishment component 750 and/or the procurement management component 765. The accounting component 760 can utilize the information regarding welding consumable(s) usage and/or welding consumable(s) inventory replenishment to perform accounting tasks, for example, to periodically post inventory valuation and cost of goods sold to general ledger accounts, to perform a physical count of inventory items (e.g., for an audit), to calculate inventory turnover rate, and to perform analysis of various inventory strategies (e.g., last in first out or first in first out) to determine potential benefits (e.g., to realize maximum tax savings).

The reorder proposal component 770 can generate a proposed reorder for welding consumable(s) (e.g., electronic order) and communicate the proposed reorder to the authorization component 775. The authorization component 775 can receive authorization for a welding consumable(s) reorder from, for example, a purchasing agent or supervisor (e.g., physical signature and/or electronic signature). Having receiving authorization to proceed with the welding consumable(s) reorder, the authorization component 775 communicates information associated with the proposed reorder to the reorder transmittal component 780. The reorder transmittal component 780 transmits the welding consumable(s) reorder (e.g., via an EDI or XML document) to the supplier component 785 (e.g., via the Internet or an extranet). The supplier component 785 can process the order and initiate an order confirmation invoice acknowledging the order and providing information to the reorder transmittal component 780. For example, the supplier component 785 can inform the reorder transmittal component 780 of the lead time, product availability, pricing information and/or expected delivery date for the order. The supplier component 785 can further enforce welding equipment and welding software maintenance, service or upgrade contract, for example, having terms that a maintenance fee is waived or reduced if order and usage requirement of welding consumable(s) is met.

In view of the exemplary systems shown and described above, methodologies, which may be implemented in accordance with the present invention will be better appreciated with reference to the flow diagrams of FIGS. 8, 9, 10 and 11. While for purposes of simplicity of explanation, the illustrated methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Further, additional and/or alternative methodologies may employ additional blocks, not illustrated herein.

Figure 8:
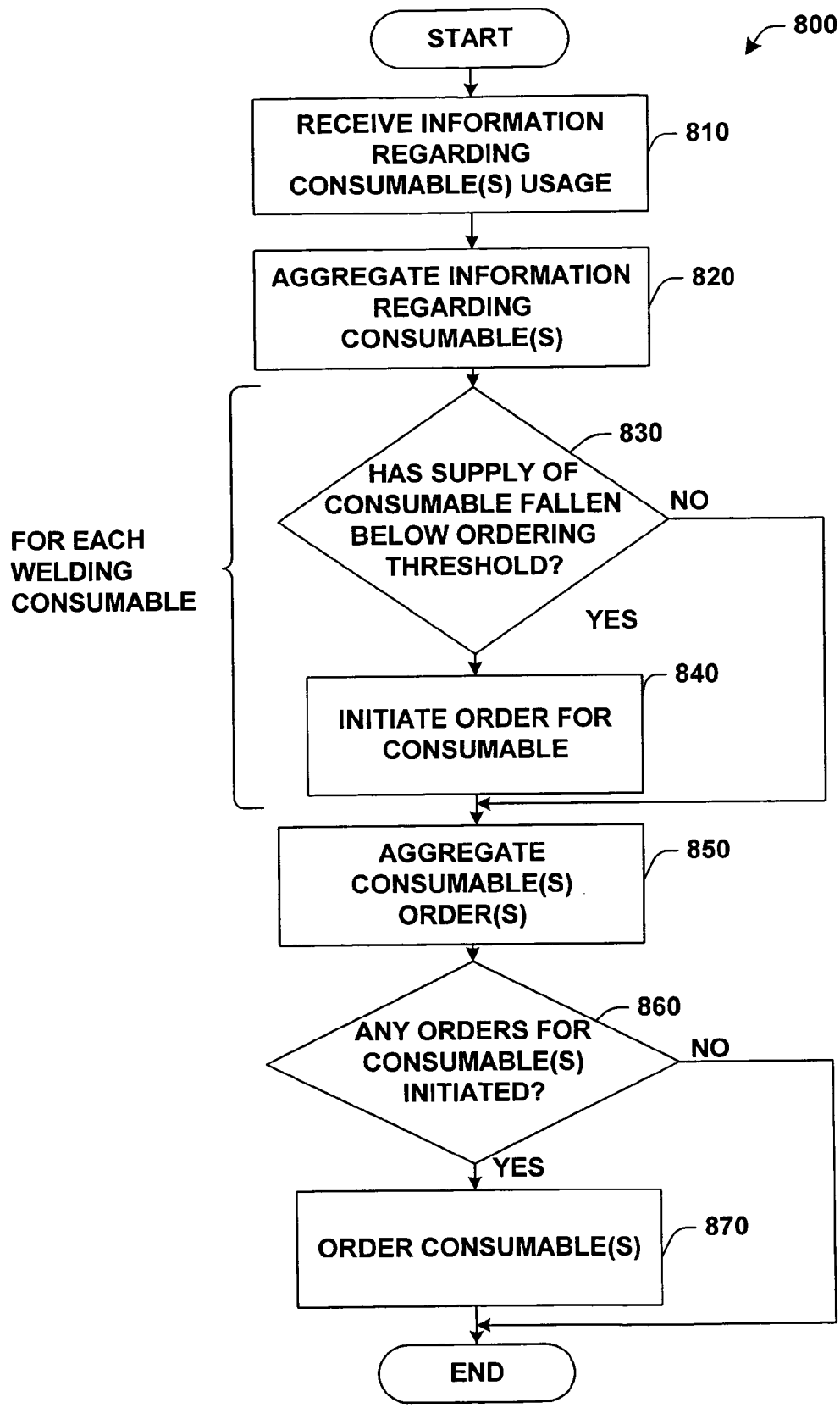
FIG. 8 is a flow chart diagram illustrating a methodology for managing welding consumable(s) in accordance with an aspect of the present invention.

Turning to FIG. 8, a methodology 800 for managing welding consumable(s) is illustrated. At 810, information regarding consumable(s) usage is received. Next, at 820, information regarding consumable(s) usage from one or more welders is aggregated. Thus, in a welding environment employing a plurality of welders, welding consumable(s) usage for substantially all of the welders can be aggregated to determine the overall impact on inventory supplies of welding consumable(s). For each consumable, at 830, a determination is made whether the supply of the consumable has fallen below a predetermined ordering threshold. If the determination is YES, at 840, ordering of the consumable is initiated. If the determination at 830 is NO, no action is taken with regard to the consumable.

Next, at 850, consumable(s) order(s) are aggregated. At 860, a determination is made whether any order for consumable(s) has been initiated. If the determination at 860 is YES, at 870, the consumable(s) are ordered (e.g., from a distributor, supplier and/or manufacturer of welding consumable(s)). If the determination at 860 is NO, no further action is taken.

Figure 9:
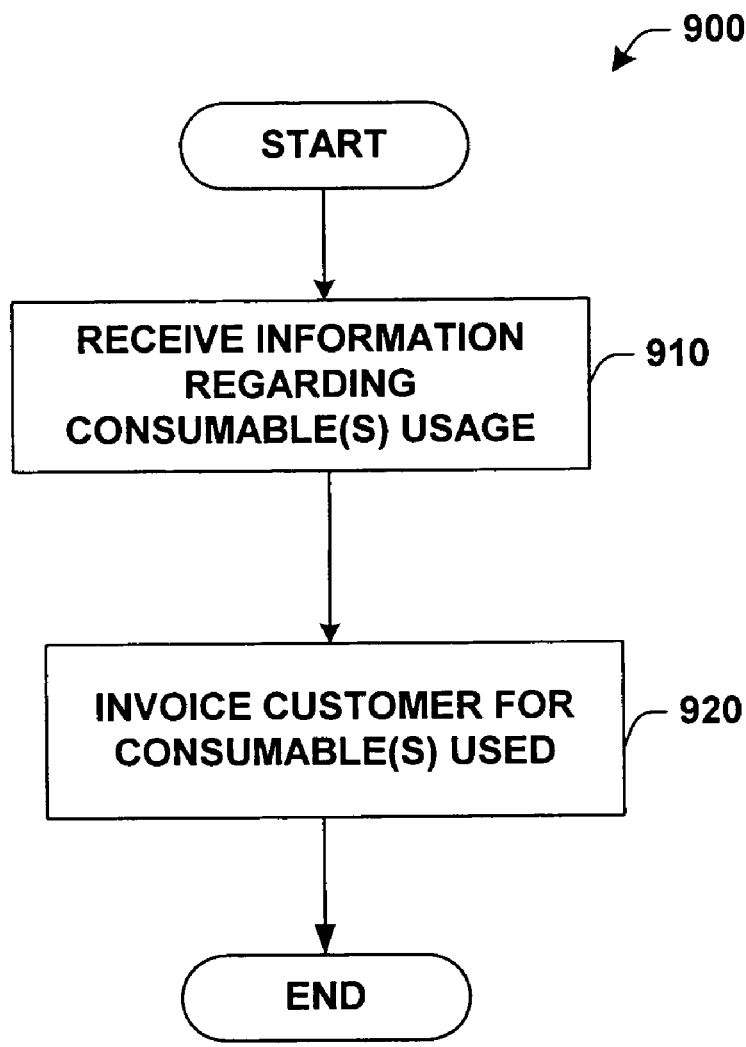
FIG. 9 is a flow chart diagram illustrating a methodology for managing welding consumable(s) in accordance with an aspect of the present invention.

FIG. 9 illustrates a methodology 900 for managing welding consumable(s) in accordance with an aspect of the present invention. At 910, information regarding consumable(s) usage is received. At 920, a customer is invoiced for consumable(s) usage. For example, a supplier of welding consumable(s) can maintain an inventory of welding consumables at a customer location (e.g., ownership of welding consumable(s) remains with supplier). At least in part based upon information received regarding consumable(s) usage, the supplier can allocate and/or charge the customer for welding consumable(s) once they have been used by the customer. This can result in a decrease in costs to the customer associated with maintaining inventory since the customer is not charged for the welding consumable(s) until they have been used. Further, the customer can delegate to the supplier responsibility for maintaining inventory of welding consumable(s) at the customer location, thus reducing the customer's costs associated with materials management.

Figure 10:
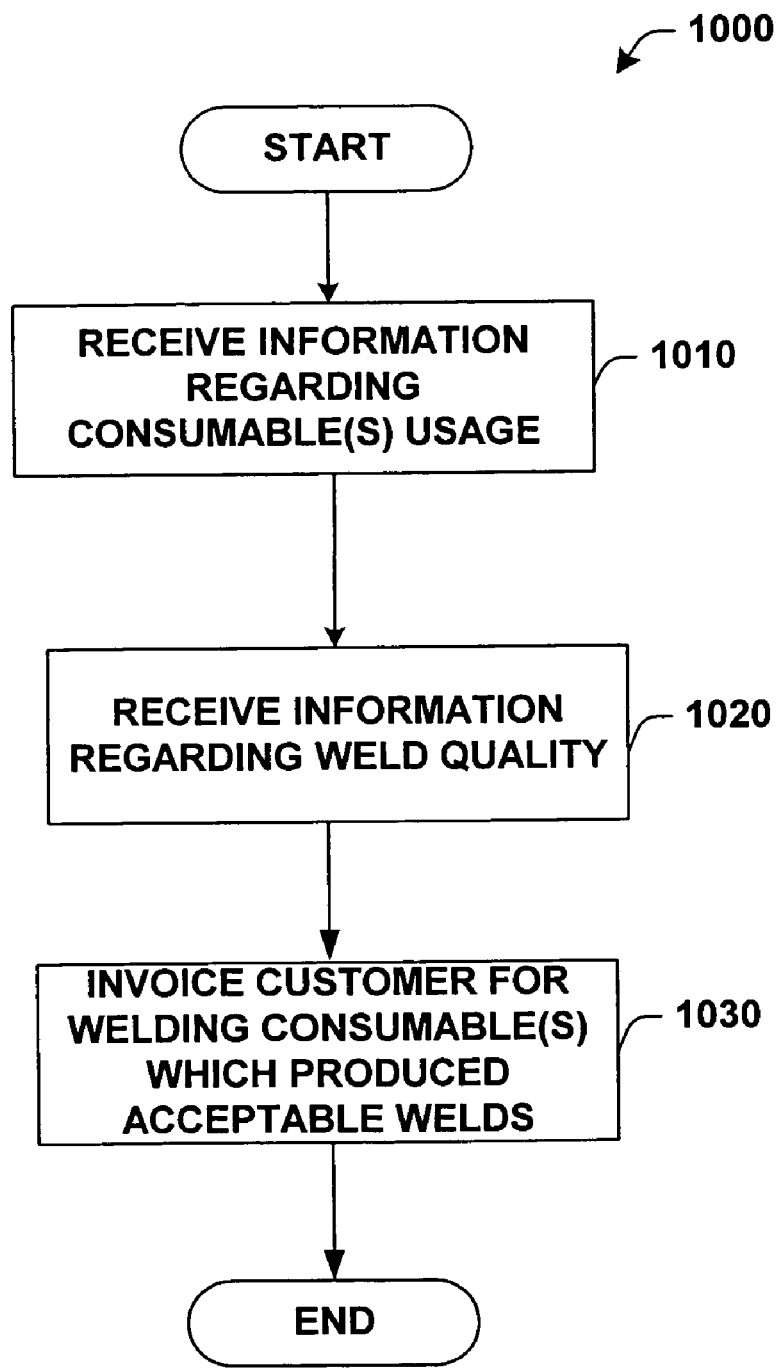
FIG. 10 is a flow chart diagram illustrating a methodology for managing welding consumable(s) in accordance with an aspect of the present invention.

Turning to FIG. 10, a methodology 1000 for managing welding consumable(s) in accordance with an aspect of the present invention is illustrated. At 1010, information regarding consumable(s) usage is received. At 1020, information regarding weld quality is received. At 1030, a customer is invoiced for consumable(s) which produced acceptable welds. For example, a welding consumable(s) supplier can receive information regarding consumable(s) usage and weld quality. Based at least in part upon the information received regarding consumable(s) usage and weld quality, the supplier can allocate and/or charge the customer for welding consumable(s) that have been used by the customer and that produced acceptable welds. This can result in cost savings to the customer since the customer is paying for welding consumable(s) that have produced acceptable welds.

Figure 11:
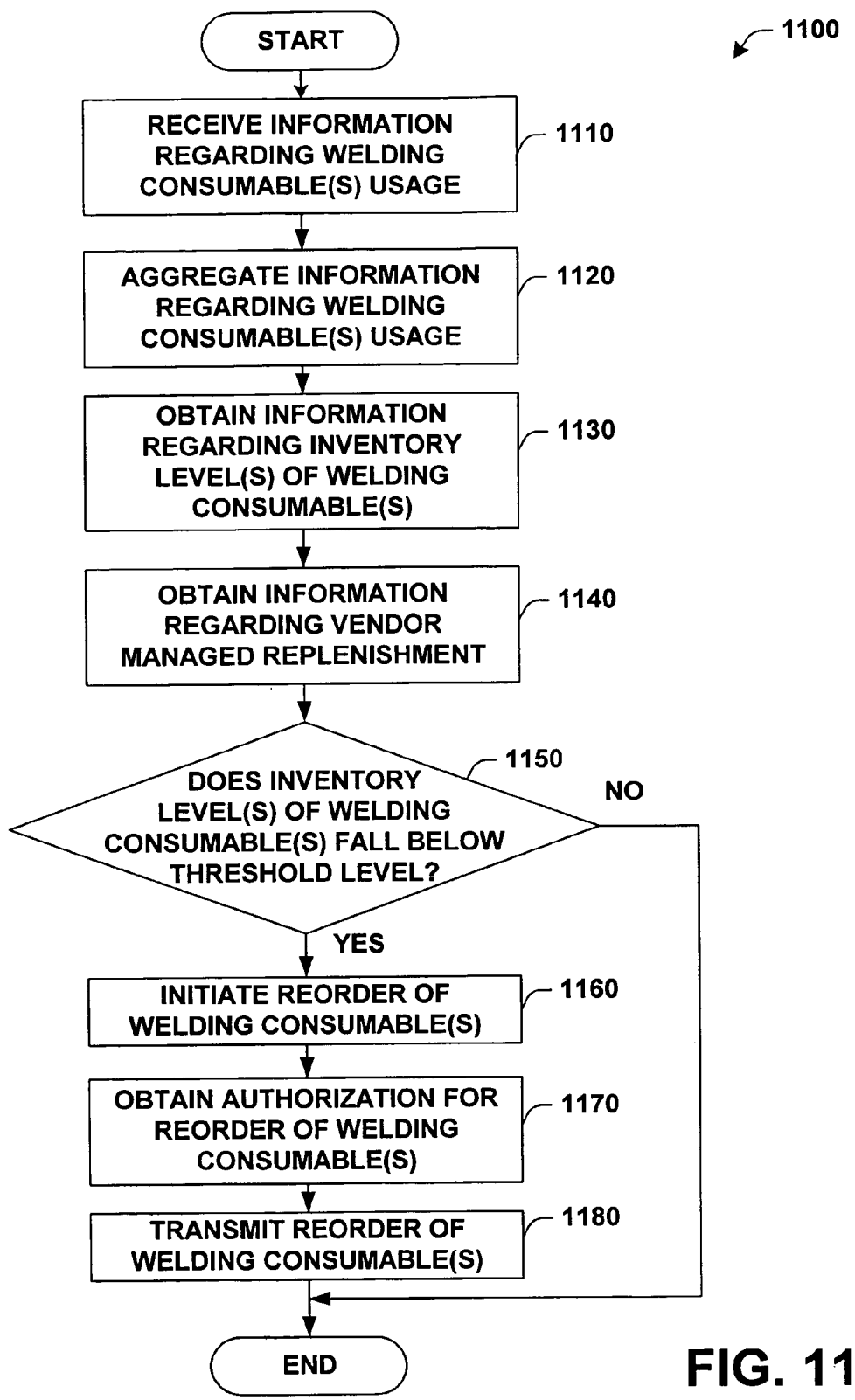
FIG. 11 is a flow chart illustrating a methodology for managing welding consumable(s) in accordance with an aspect of the present invention.

Referring to FIG. 11, a methodology 1100 for managing welding consumable(s) is illustrated. At 1110, information regarding consumable(s) usage is received. Next, at 1120, information regarding consumable(s) usage from one or more welders is aggregated. Thus, in a welding environment employing a plurality of welders, welding consumable(s) usage for substantially all of the welders can be aggregated to determine the overall impact on inventory supplies and/or inventory replenishment of welding consumable(s). At 1130, information regarding inventory level(s) of welding consumable(s) is obtained. At 1140, information regarding vendor managed replenishment is obtained. At 1150, a determination is made whether the inventory level(s) of welding consumable(s) has fallen below a threshold (e.g., based at least in part upon information included in a vendor managed replenishment contract and/or vendor equipment lease/supply contract, lead time, usage rate forecast, welding consumable(s) in transit and/or safety stock requirements). If the determination at 1150 is YES, at 1160, reordering of welding consumable(s) is initiated. At 1170, authorization for reordering of welding consumable(s) is obtained (e.g., physical signature and/or electronic signature). At 1180, a reorder of welding consumable(s) is transmitted (e.g., via XML or EDI format) to, for example, a welding consumable(s) supplier, distributor and/or manufacturer. If the determination at 1150 is NO, no further action is taken.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:
1. A system for managing at least one welding consumable, comprising:
    a welder, comprising:
        a consumables monitor that monitors an amount of at least one consumable consumed; and
        an arc/weld quality monitor that monitors quality of at least one weld; and a remote system communicatively coupled to the welder via a network, the remote system comprising:
        a production control component that receives information from the consumables monitor regarding the amount of the at least one consumable consumed or the amount of the at least one consumable remaining and measures a consumable demand rate based at least in party upon a production control policy and the received information;
        a financial account component that receives information from the consumables monitor regarding the amount of the at least one consumable consumed or the amount of the at least one consumable remaining and performs accounting tasks based at least in part upon the received information;
        a materials management component that receives information from the consumables monitor regarding the amount of the at least one consumable consumed or the amount of the at least one consumable remaining and performs inventory control based at least in part upon the received information;
        an inventory management component that maintains data regarding an inventory of the at least one consumable at a customer location, adjusts the inventory based at least in part on the information received from the consumables monitor regarding the amount of the at least one consumable consumed or the amount of the at least one consumable remaining and charges the customer for an amount of the at least one welding consumable used by the customer based at least in part upon the change in inventory.

2. The system of claim 1, the inventory control includes ordering or purchasing the at least one consumable based at least in part upon the information received from the consumables monitor.

3. The system of claim 1, the at least one consumable is at least one of: wire, gas, flux, contact tip or consumable electrode.

4. The system of claim 3, the wire is used for at least one of gas metal arc welding, flux cored arc welding, metal cored arc welding, submerged arc welding, narrow groove welding, hot wire filled TIG welding, cold wire filled TIG welding, plasma arc welding, electron beam and laser welding, or hardface welding.

5. The system of claim 3, the consumable electrode is used for at least one of: arc gauging or manual shielded arc welding.

6. The system of claim 1, the inventory control is further based at least in part upon an ordering model stored on the remote system.

7. The system of claim 1, the inventory control is further based at least in part upon a vendor managed replenishment contract.

8. The system of claim 7, ownership of the at least one consumable remains with a supplier, distributor or manufacturer until the at least one consumable has been used by a customer.

9. The system of claim 1, the welder is leased to a customer and enforcement of the lease is performed at least in part based upon information received from the consumables monitor.

10. The system of claim 1, the remote system enforces at least one of: a welding equipment maintenance contract, a welding software maintenance contract, a welding service contract, or a welding upgrade contract.

11. The system of claim 1 the remote system produces an invoice for the at least one consumable based at least in part upon the information.

12. The system of claim 1, the network employs at least one of: Ethernet, Wireless Ethernet, PPP (point-to-point protocol), point-to-multipoint short-range RF (Radio Frequency), WAP (Wireless Application Protocol), Bluetooth, IP, IPv6, TCP, User Datagram Protocol (UDP), PPTP (Point-to-Point Tunneling Protocol), L2TP (Layer Two Tunneling Protocol), IPsec (Internet Protocol Security) or SOCKS.

13. The system of claim 1, information includes at least one of: HTML, SHTML, VB Script, JAVA, CGI Script, JAVA Script, dynamic HTML, ASP, ActiveX, XML, PDF, EDI and WML format.

14. The system of claim 1, the welder and the remote system are communicatively coupled via at least one of: a LAN, a phone connection or a gateway.

15. The system of claim 1, the network is at least one of: a local computer network, an extranet or the Internet.

16. The system of claim 1, the remote system generates an invoice for the at least one consumable based at least in part upon information regarding weld quality received from the arc/weld quality monitor.

17. The system of claim 16, the remote system tracks patterns of usage of the at least one consumable or inventory levels of the at least one consumable.

18. The system of claim 16, the remote system facilitates Just-In-Time (JIT) raw material inventory management to achieve low inventory of the at least one consumable or high service level objectives in production.

19. The system of claim 1, the remote system performs at least one of: enterprise resource planning, production capacity planning or forecast planning based at least in part upon the information.

20. The system of claim 1, the remote system charges for the at least one component as the at least one component is used by the welder based at least in part upon the quality of the at least one weld.

21. The system of claim 1, ownership of the at least one consumable remains with a supplier until the at least one consumable is used by the customer.

22. A method for managing welding consumables, comprising:
employing a processor to execute computer readable instructions stored in a computer readable medium to perform the following acts:
monitoring an amount of at least one consumable consumed through a consumables monitor;
monitoring quality of at least one weld through a remote system communicatively coupled to the welder via a network;
receiving information from the consumables monitor regarding the amount of the at least one consumable consumed or the amount of the at least one consumable remaining and measuring a consumable demand rate based at least in party upon a production control policy and the received information;
receiving information from the consumables monitor regarding the amount of the at least one consumable consumed or the amount of the at least one consumable remaining and performing accounting tasks based at least in part upon the received information;
receiving information from the consumables monitor regarding the amount of the at least one consumable consumed or the amount of the at least one consumable remaining and performing inventory control based at least in part upon the received information;
maintaining data regarding an inventory of the at least one consumable at a customer location, adjusting the inventory based at least in part on the information received from the consumables monitor regarding the amount of the at least one consumable consumed or the amount of the at least one consumable remaining and charging the customer for an amount of the at least one welding consumable used by the customer based at least in part upon the change in inventory;
determining whether supply of each of the at least one welding consumable has fall below a predefined ordering threshold amount based at least in part on the information regarding consumption of each of the at least one welding consumable; and
ordering each of the at least one welding consumable based at least in part upon the determination that the supply of each of the at least one welding consumable has fall below the predefined ordering threshold.

23. The method of claim 22, further comprising aggregating information regarding the usage of each of the at least one welding consumable from one or more welders.

24. The method of claim 22, further comprising aggregating information regarding the ordering of each of the at least one consumable.

25. The method of claim 22, wherein the threshold ordering amount is based at least in part upon at least one of: a vendor managed replenishment contract, a supplier's lead time for the consumable, a consumable forecast usage rate, availability of the consumable or pricing data for the consumable.

26. The method of claim 22, wherein the threshold ordering amount is updated continuously and in real-time.

* * * * *